United States Patent [19]

Grana et al.

[11] 4,191,893

[45] Mar. 4, 1980

[54] NATURAL TURBULENCE ELECTRICAL POWER GENERATOR

[75] Inventors: David C. Grana; Richard T. Wilem, both of Newport News, Va.

[73] Assignee: The United States of America as represented by the Administrator of the National Aeronautics and Space Administration, Washington, D.C.

[21] Appl. No.: 883,090

[22] Filed: Mar. 3, 1978

[51] Int. Cl.² .............................................. F03B 13/12
[52] U.S. Cl. ......................................... 290/53; 310/30
[58] Field of Search ..................... 290/42, 53; 310/15, 310/30, 36, 37, 38, 39, 40 R, 40 MM, 12; 322/3; 115/4; 200/61.46

[56] References Cited
U.S. PATENT DOCUMENTS 3,526,793 9/1970 Fidi et al. ................................. 310/36
3,696,251 10/1972 Last et al. .............................. 290/53

Primary Examiner—J. V. Truhe
Assistant Examiner—Morris Ginsburg
Attorney, Agent, or Firm—William H. King; John R. Manning; Howard J. Osborn

[57] ABSTRACT

An energy conversion apparatus is disclosed in which a stator, fixed relative to a watertight housing, is coupled to a rotor by a helical spring which suspends the rotor from the housing. Natural turbulence of a fluid, such as water or air, causes acceleration of the housing, and hence, acceleration of the stator. Inertia of the rotor, coupled to the stator through the helical spring and the housing, causes relative motion, both longitudinal and rotational, between the stator and the rotor, the rotational motion between the rotor, and the stator being used to generate electrical current.

6 Claims, 4 Drawing Figures

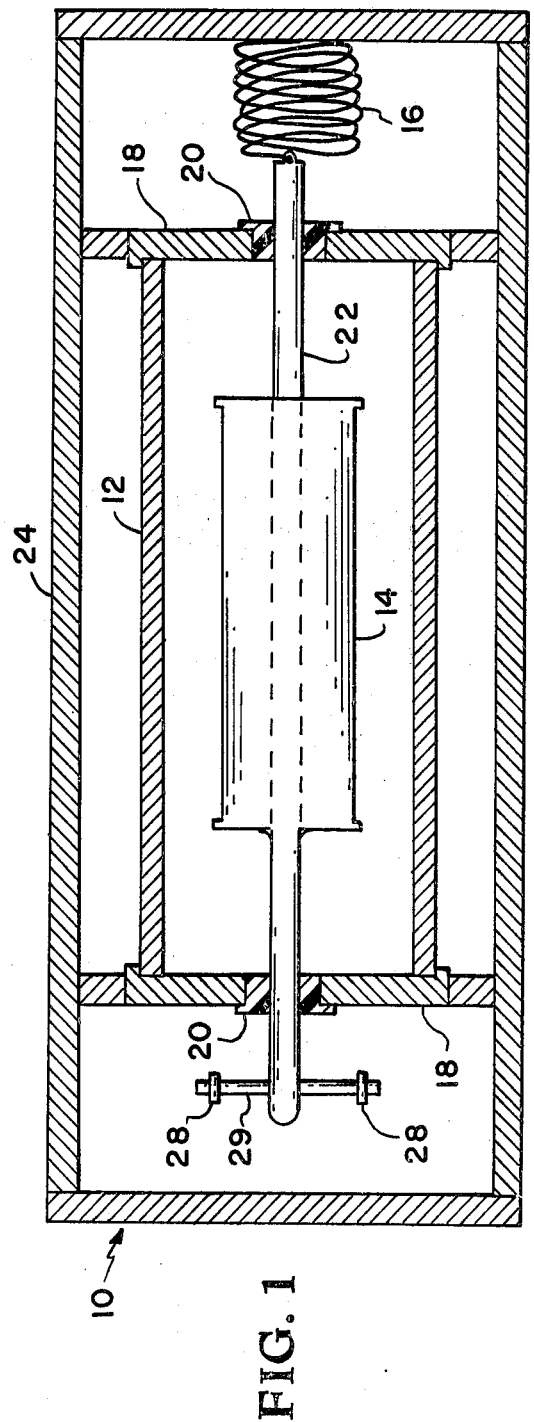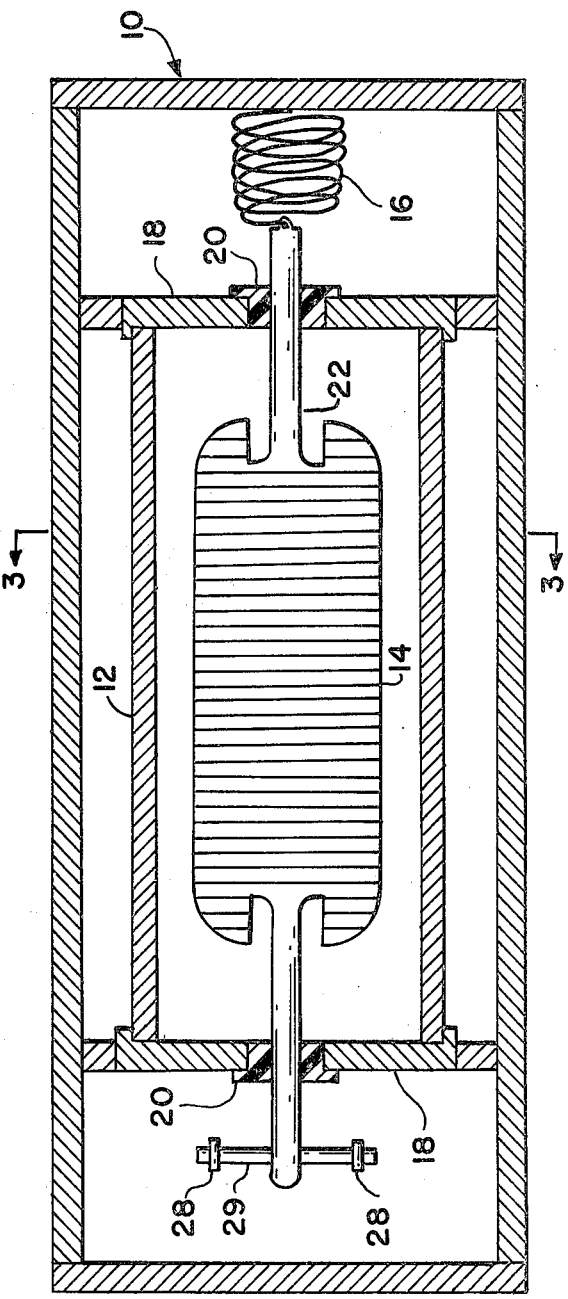
FIG. 1
FIG. 2

NATURAL TURBULENCE ELECTRICAL POWER GENERATOR

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

The invention relates generally to power generating means and more particularly concerns apparatus for converting the natural turbulence of a fluid, such as water or air, into electrical energy.

DESCRIPTION OF THE PRIOR ART

A variety of devices have been proposed for converting turbulent fluid motion or random oscillating motion into electrical energy. One technique uses wave action to cause a conducting, expandable coil to oscillate between a fixed platform and a floating platform, cutting the lines of a magnetic field and generating electrical current. Another technique utilizes the rocking motion of the waves to rotate various gear arrangements to drive an electrical generator. Yet another device uses an armature mounted on springs to generate electrical current caused by the relative longitudinal movement between the armature and the stator.

The various devices described in the prior art, while producing electrical power from wave action or other random motion, produce power in increments. It is therefore an object of the present invention to produce electrical power on a more continuous basis from random wave action.

SUMMARY OF THE INVENTION

The present invention comprises an electrical generator wherein the stator and rotor are coupled by a helical spring. The rotor is suspended from the helical spring such that vertical acceleration of the stator causes relative movement between the rotor and stator, the helical spring causing the rotor to rotate, generating electrical current.

BRIEF DESCRIPTION OF THE DRAWINGS

FIG. 1 is a cross-sectional view of one embodiment of the present invention.

FIG. 2 is a cross-sectional view of another embodiment of the present invention.

DESCRIPTION OF THE PREFERRED EMBODIMENT

Figure 3:
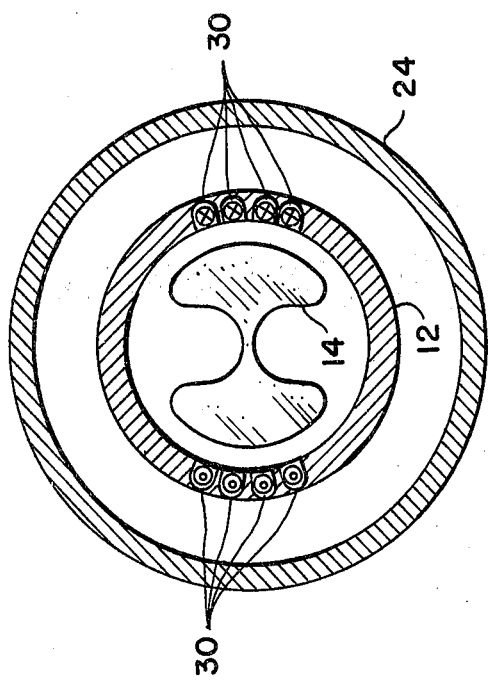
FIG. 3 is a section, partially in schematic, along lines 3—3 of the generator shown in FIG. 2.

Referring now to the drawings, there is illustrated a preferred embodiment of the present invention as it would be used in a buoy. FIG. 1 shows a generator, designated generally by the reference numeral 10, comprised of three major parts, a housing 24, a stator 12, and a rotor 14.

The housing 24 provides support for the stator 12 and the rotor 14. When used as a buoy the housing also provides watertight containment.

The stator 12 in this embodiment is a permanent magnet. The stator establishes magnetic flux paths across the space occupied by the rotor 14. The stator 12 is supported by end plates 18, which are fixed to the housing 24.

The rotor 14, cylindrical in shape, occupies the cylindrical interior of the stator 12, and is suspended from the housing 24, by a helical spring 16. The helical spring 16, in addition to providing support, couples the rotor 14, through the housing 24, to the stator 12. Nylon bushings 20, fixed in the end plates 18, keep a rotor shaft 22, and hence the rotor 14, aligned with the longitudinal axis of the stator 12. A bar 29 with adjustable weights 28 is fixed to the lower end of the rotor shaft 22. The weights 28, may be adjusted to various distances from the rotor shaft 22, in order to adjust the period of rotation of the rotor 14. In this embodiment the rotor 14 serves as the armature.

Vertical acceleration of the generator housing 24, causes linear oscillations of the rotor 14 in relation to the stator 12, which is fixed to the housing 24, because of the inertia of rotor 14. The helical spring 16, which supports the rotor 14, imparts a twisting motion to the rotor 14 as the spring 16 is stretched. As the spring 16 contracts it imparts a rotation movement of the rotor 14 in the opposite direction. As the windings on the rotor (not shown) cut the magnetic field induced by the stator 12, electric current is produced in the windings of the rotor 14. This current can be picked off slip rings (not shown) and rectified. The current can then be used to charge batteries or operate electrical equipment.

FIG. 2 shows an alternate embodiment of the present invention. In this embodiment the rotor 14 is a permanent magnet and the stator 12 is the armature. Thus, in this embodiment, slip rings would not be necessary. Operation of this embodiment would be the same as described for the embodiment shown in FIG. 1.

FIG. 3 shows a section along lines 3-3 of the embodiment shown in FIG. 2. This view gives a better view of the armature windings 30, which are located on the stator in this figure and in FIG. 2.

Figure 4:
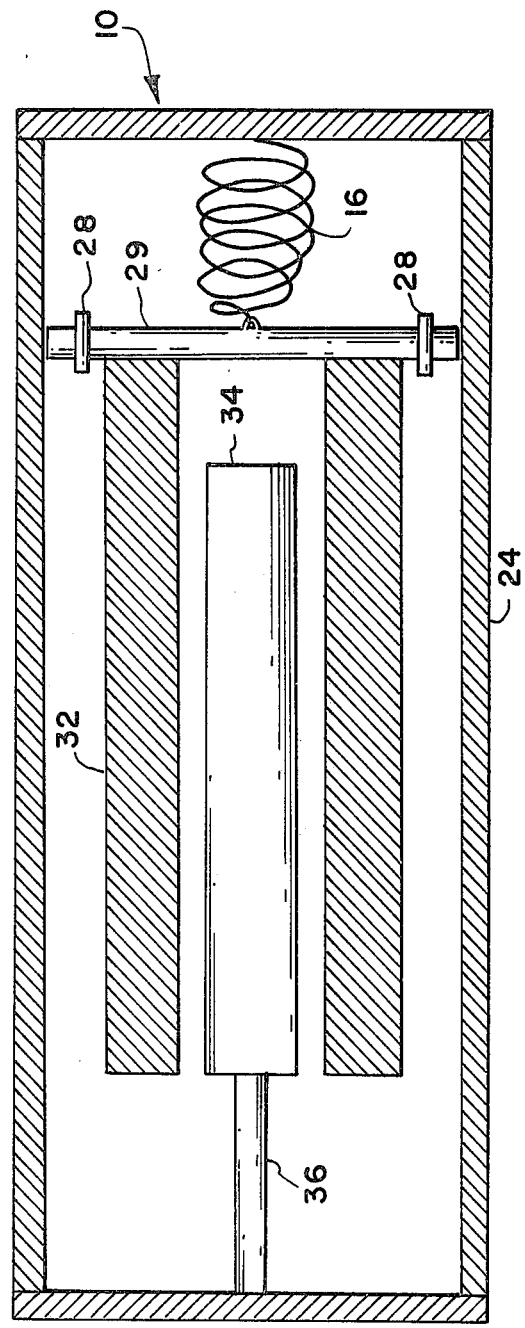
FIG. 4 is a cross-sectional view of another embodiment of the present invention.

FIG. 4 shows an embodiment of the present invention wherein the central cylinder 34 is the "stator" and the outer cylinder 32 is the "rotor." The central cylinder 34 is fixed to the housing 24 by a shaft 36 and remains stationary with respect to the housing 24 during oscillation of the buoy. The outer cylinder 32 is a permanent magnet and is coupled to the central cylinder 34 through the helical spring 16 and the housing 24. The helical spring 16 suspends the outer cylinder 32 and imparts rotational motion to the outer cylinder 32 when the generator 10 is disturbed. The central cylinder 34 is the armature in this embodiment.

It will be understood that the foregoing descriptions are of the preferred embodiments of the invention and are therefore merely representative. Obviously there are many variations and modifications of the present invention in light of the preceding teachings. It is therefore to be understood that within the scope of the appended claims the invention may be practiced otherwise than is specifically described.

What is claimed as new and desired to be secured by Letters Patent of the United States is:

1. Apparatus for converting the natural turbulence of a fluid, such as water or air, into electrical energy comprising:

a housing mounted such that it is set in motion by said natural turbulence of a fluid;

a stator means mounted in said housing and fixed relative to said housing;

a rotor means;

means for mounting said rotor means in said housing such that the movement of the rotor means is unrestrained longitudinally and rotationally relative to said stator means and such that movement of the rotor means is restrained laterally relative to the stator means with the lateral distance between the rotor means and stator means remaining essentially constant;

a single helical spring with one end of the helical spring attached to said housing and the other end of the helical spring attached to the center of one end of said rotor means and suspending said rotor means whereby the turbulence of said fluid causes a force to be applied parallel to the longitudinal axis of the helical spring resulting in longitudinal and rotational motion of said rotor means relative to said stator means; and means included with said stator means and said rotor means for converting said rotational motion into electrical energy.

2. Apparatus as in claim 1 wherein said stator means is a permanent magnet.

3. Apparatus as in claim 2 wherein said rotor means is an armature.

4. Apparatus as in claim 1 wherein said stator means is an armature.

5. Apparatus as in claim 4 wherein said rotor means is a permanent magnet.

6. Apparatus as in claim 1 wherein said rotor means has a bar means normal to the longitudinal axis of the rotor means with weights which can be adjusted to various distances from the rotor means longitudinal axis to vary the rotation rate of the rotor means.

* * * * *